United States Patent [19]

Neary et al.

[11] Patent Number: 5,744,922
[45] Date of Patent: Apr. 28, 1998

[54] CURRENT REGULATOR

[75] Inventors: Michael B. Neary, Manhattan Beach; Michael J. Rainey, Lakewood, both of Calif.

[73] Assignee: Xerox Corporation, Stamford, Conn.

[21] Appl. No.: 714,711

[22] Filed: Sep. 16, 1996

[51] Int. Cl.$^6$ ...................................................... H02P 1/00
[52] U.S. Cl. .......................... 318/293; 318/362; 318/370
[58] Field of Search ................................ 318/138, 139, 318/245, 260–293, 430, 434, 599, 600, 603

[56] References Cited

U.S. PATENT DOCUMENTS

| | | | |
|---|---|---|---|
| 4,677,356 | 6/1987 | Tsuneda et al. | 318/258 |
| 4,710,686 | 12/1987 | Guzik | 318/293 |
| 4,879,641 | 11/1989 | Rossi et al. | 363/98 |
| 4,924,158 | 5/1990 | Kelly et al. | 318/434 |
| 4,926,101 | 5/1990 | Enomoto et al. | 318/374 |
| 4,972,133 | 11/1990 | Hirota et al. | 318/646 |
| 4,985,666 | 1/1991 | Nakabayashi | 318/434 |
| 5,045,766 | 9/1991 | Vermersch | 318/293 |
| 5,332,954 | 7/1994 | Lankin | 318/139 |
| 5,343,382 | 8/1994 | Hale et al. | 363/98 |
| 5,483,404 | 1/1996 | Nakano | 361/18 |
| 5,495,154 | 2/1996 | Carobolante | 318/254 |

*Primary Examiner*—Paul Ip
*Attorney, Agent, or Firm*—Fariba Rad

[57] ABSTRACT

A current regulator is disclosed which utilizes a well known driver chip. The driver chip has an input signal known as a brake signal "BRK" which typically is used to stop a standard DC motor. In this invention, the brake signal "BRK" is used to create a low resistance current path in order to sustain the current of the current regulator which is used in conjunction with a stepper motor.

6 Claims, 4 Drawing Sheets

5,744,922

CURRENT REGULATOR

BACKGROUND OF THE INVENTION

This invention relates to a current regulator, and more particularly to a current regulator which utilizes a driver chip to create a low resistance current path to sustain the current of a stepper motor.

Referring to FIG. 1, there is shown a prior art current regulator circuit 10 used in conjunction with a stepper motor. In FIG. 1, a voltage supply $V_m$ is connected to the collectors $c_1$ and $c_2$ of two power transistors $T_1$ and $T_2$ respectively. The emitter $e_1$ of the transistor $T_1$ is connected to the emitter $e_2$ of the transistor $T_2$ through a stepper motor which is shown as an inductance L connected to nodes 12 and 14. The anode of a diode $D_1$ is connected to node 12 and its cathode is connected to $V_M$. The anode of diode $D_2$ is connected to node 14 and its cathode is connected to $V_M$.

In FIG. 1, there are two more transistors $T_3$ and $T_4$. The collector $c_3$ of the transistor $T_3$ is connected to the emitter $e_1$ of the transistor $T_1$, and the collector $c_4$ of the transistor $T_4$ is connected to the emitter $e_2$ of the transistor $T_2$. The two emitters $e_3$ and $e_4$ of the transistors $T_3$ and $T_4$ are connected to each other at node 16 and the node 16 is connected to ground G through a resistor R. There are two diodes $D_3$ and $D_4$ between the node 16 and the nodes 12 and 14. The cathode of the diode $D_3$ is connected to node 12 and its anode is connected to node 16 and the cathode of diode $D_4$ is connected to node 14 and its anode is connected to node 16.

In addition, there are four AND gates $A_1$, $A_2$, $A_3$ and $A_4$ each of which is connected to a base $b_1$, $b_2$, $b_3$, and $b_4$ of one of the transistors $T_1$, $T_2$, $T_3$ and $T_4$ respectively. Each AND gate can activate its respective transistor.

Signal Fwd is connected to the gates $A_1$ and $A_4$ and signal Rev is connected to the gates $A_2$ and $A_3$. When signal Fwd is "1", it activates the gates $A_1$ and $A_4$ which in turn active the transistors $T_1$ and $T_4$. When signal Rev is "1", it activates the gates $A_2$ and $A_3$ which in turn activate the transistors $T_2$ and $T_3$.

With this arrangement, at any given time, either the transistors $T_1$, and $T_4$ are activated or the transistors $T_2$ and $T_3$ are activated.

In the circuit 10 of FIG. 1, once the voltage $V_M$ is turned on, if the signal Fwd is "1", then the transistor $T_1$, creates a current M which flows through the stepper motor L, the transistor $T_4$, and resistor R into ground G. The voltage $V_R$ from the resistor R at node 16 will be sent to a comparator 18. Comparator 18 will compare this voltage $V_R$ to a reference voltage $V_{Ref}$. Once the voltage $V_R$ reaches the reference voltage $V_{Ref}$, the comparator 18 sends out a signal 20. Signal 20 from the comparator 18 triggers the one shot timer 22. The one shot timer 22 sends out a limit signal 24 and maintains the limit signal 24 for a given period of time. The signal 24 in activates both gates $A_1$ and $A_2$. However, since at any given time either gate $A_1$ or gate $A_2$ is active, the signal 24 inactivates the active gate. In this example, since gate $A_1$ was active, the signal 24 inactivates gate $A_1$ which in turn inactivates the transistor $T_1$.

Once the transistor $T_1$ is inactivated, the current M will start flowing into loop A. Loop A comprises stepper motor L, transistor $T_4$ and diode $D_3$. The current M keeps circulating in loop A. However, due to the structure of bipolar transistor $T_4$ and diode $D_3$, they waste power. The power waste is due to a voltage drop across the transistor $T_4$ and diode $D_3$. The power waste reduces the energy within the inductance L which in turn causes the current in loop A to substantially decrease.

In order to constraint the current from decreasing below a level, after a certain time which is measured by the one shot timer 22, the one shot timer 22 will tun off the limit signal 24. Once the limit signal 24 is turned off, gate $A_1$ will be activated and the transistor $T_1$ will be turned on which causes the current M to increase to level $1_{Ref}$ and cause the voltage $V_R$ to increase back to level $V_{Ref}$. Once the voltage $V_R$ reaches the voltage $V_{Ref}$, signals 20 and 24 will be generated which will turn off the transistor $T_1$. With this approach the current of the stepper motor can be regulated.

Referring to FIG. 2, there is shown a current M generated through the circuit 10 of FIG. 1. The current during periods $t_1$, is the current which is generated when the transistors $T_1$ and $T_4$ are on. The current during periods $t_2$, is the current which is circulating within loop A and as can be observed, during period $t_2$, the current M substantially reduces.

Referring back to FIG. 1, it should be noted that if the Rev signal is on, then transistors $T_2$ and $T_3$ will generate a current in the opposite direction of current M and after the transistor $T_2$ is turned off, the generated current will be circulating in loop B which comprises the stepper motor L, transistor $T_3$ and diode $D_4$.

The major problem in this approach is having diodes $D_3$ and $D_4$ in conjunction with the bipolar transistors $T_3$ and $T_4$. In Loop A diode $D_3$ and transistor $T_4$ and in loop B diode $D_4$ and transistor $T_3$ waste power and cause the current during period $t_2$ to substantially decrease. Therefore, this circuit is an inefficient current regulator.

It is an object of this invention to provide an efficient current regulator.

SUMMARY OF THE INVENTION

In accordance with the present invention, there is disclosed a current regulator for a stepper motor which utilizes a driver chip which is well known in the industry. The driver chip used in this invention has an input signal known as brake signal "BRK" which is typically used to stop a standard DC motor. As opposed to the traditional usage of the brake current, in this invention the brake signal BRK is used to create a low resistance current path to sustain the current of the stepper motor.

DETAILED DESCRIPTION OF THE INVENTION

Figure 1:
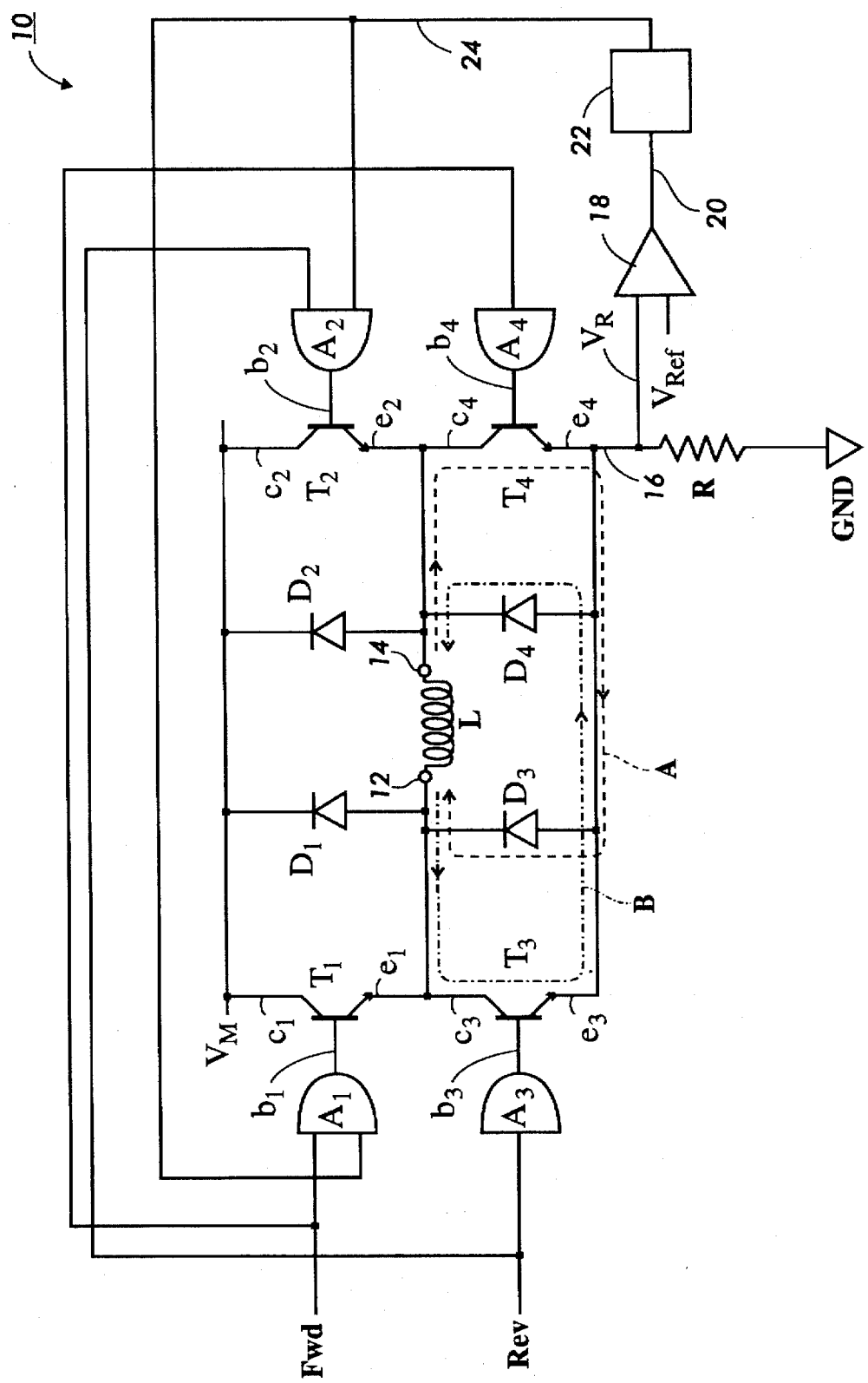
FIG. 1 shows a prior art current regulator circuit of a stepper motor.
Figure 2:
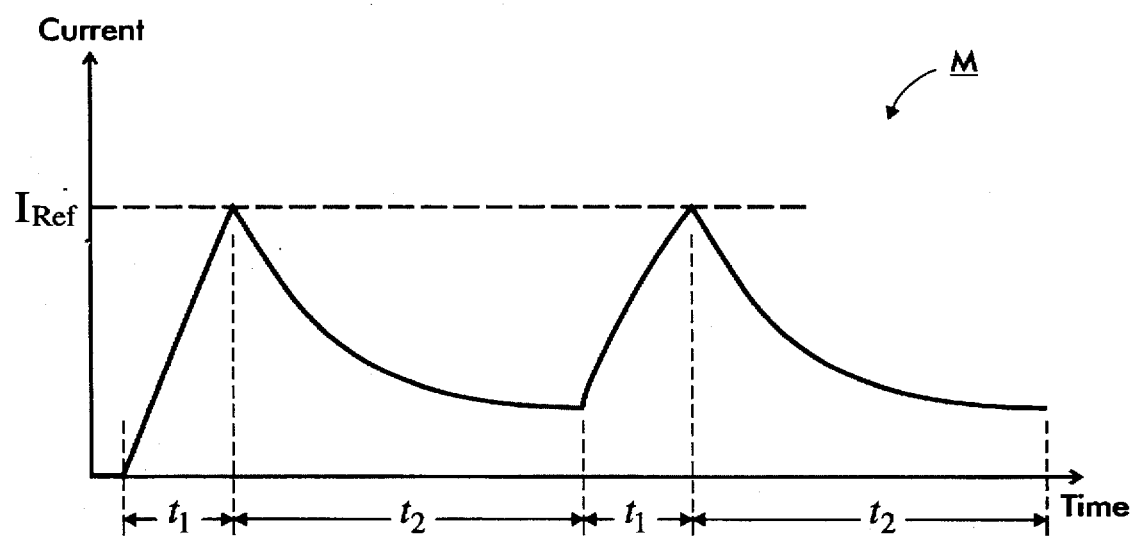
FIG. 2 shows a current generated through the circuit of FIG. 1.
Figure 3:
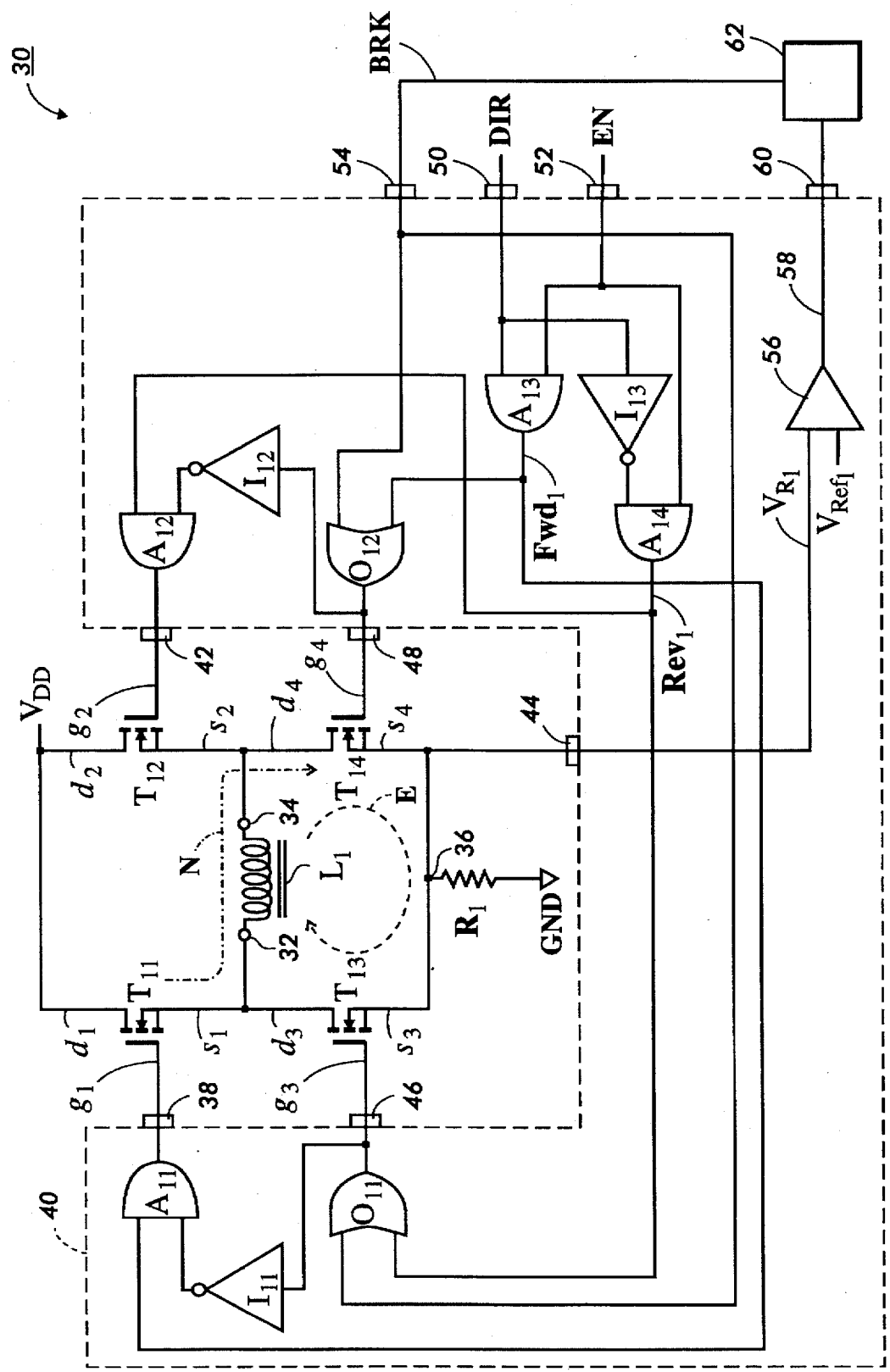
FIG. 3 shows a current regulator circuit of a stepper motor of this invention.

Referring to FIG. 3, there is shown a current regulator circuit 30 of this invention used for a stepper motor. In FIG. 3, the transistors $T_1$, $T_2$, $T_3$, and $T_4$ of FIG. 1 are replaced by power Metal-Oxide Semiconductor Field-Effect Transistors (MOSFETs) $T_{11}$, $T_{12}$, $T_{13}$ and $T_{14}$.

In FIG. 3, a stepper motor shown as L1 is connected to two nodes 32 and 34. The drains $d_1$ and $d_2$ of transistor $T_{11}$ and $T_{12}$ are connected to the power supply $V_{DD}$ and the source $S_1$ of the transistor $T_{11}$ is connected to node 32 and the source $S_2$ of transistor $T_{12}$ is connected to node 34. The drains $d_3$ and $d_4$ of transistor $T_{13}$ and $T_{14}$ are connected to the nodes 32 and 34 respectively and the sources $S_3$ and $S_4$ of transistors $T_{13}$ and $T_{14}$ are connected to node 36 which is connected to ground G through resistor $R_1$.

The gate $g_1$ of the transistor $T_{11}$ is connected to an output pin 38 of a driver chip 40. Pin 38 is a pin which activates or inactivates the transistor $T_{11}$. In the same manner, the gate $g_2$ of the transistor $T_{12}$ is connected to an output pin 42 of the driver chip 40 and pin 42 activates or deactivates the transistor $T_{12}$. The gate $g_3$ of transistor $T_{13}$ and gate $g_4$ of the transistor $T_{14}$ are connected to output pins 46 and 48 respectively and the pins 46 and 48 activate or deactivate the transistors $T_{13}$ and $T_{14}$ respectively.

It should be noted that the driver chip 40 is a "configurable H bridge driver chip" (Si9978) by Siliconix which is a well known chip in the industry and typically it is used in conjunction with standard DC motors. It should also be noted that the chip 40 is simplified and only the elements and connections that are essential for this invention are shown.

The driver chip 40 has two AND gates $A_{11}$ and $A_{12}$, two OR gates $O_{11}$ and $O_{12}$ respectively and two inverters $I_{11}$ and $I_{12}$. The output of the and gate $A_{11}$ is connected to pin 38, the output of the gate $A_{12}$ is connected to pin 42. The output of the gate $O_{11}$ is connected to pin 46 and the output of the gate $O_{12}$ is connected to pin 48. The inverter $I_{11}$ connects the output of the gate $O_{11}$ to one of the inputs of the gate $A_{11}$ and the inverter $I_{12}$ connects the output of the gate $O_{12}$ to one of the inputs of the AND gate $A_{12}$.

In the driver chip 40, an input pin 50 is dedicated to direction signal DIR, an input pin 52 is dedicated to enable signal EN and an input pin 54 is dedicated to a signal known as "brake signal" BRK. Direction signal DIR selects the direction of stepper motor. Direction signal DIR is connected to an AND gate $A_{13}$ and connected to an AND gate $A_{14}$ through an inverter $I_{13}$. The Enable signal EN is connected to both gates $A_{13}$ and $A_{14}$. When the Enable signal EN is "1", then if direction signal DIR is "1", the gate $A_{13}$ generates a forward signal $Fwd_1$. Forward signal $Fwd_1$, which is connected to gates $A_{11}$ and $O_{12}$ activates gates $A_{11}$ and $O_{12}$ which in turn activate transistors $T_{11}$ and $T_{14}$ respectively. When the Enable signal EN is "1", then if direction signal DIR is "0", the gate $A_{14}$ generates a reverse signal $Rev_1$. Reverse signal $Rev_1$ which is connected to gates $A_{12}$ and $0_{11}$ activates gates $A_{12}$ and $O_{11}$ which in turn activate transistors $T_{12}$ and $T_{13}$ respectively.

With the configuration of chip 40, at any given time, only the forward signal $Fwd_1$ or the reverse signal $Rev_1$ can be active. Therefore, at any given time only the transistors $T_{11}$ and $T_{14}$ or the transistors $T_{12}$ and $T_{13}$ can be active.

In the chip 40, the brake signal BRK is connected to both gates $O_{11}$ and $O_{12}$. Since the chip 40 is typically used in conjunction with standard DC motors, the common usage of the brake signal BRK is to stop the standard DC motor. In a standard DC motor, since the motor is continuously rotating in one direction, it becomes like a generator that generates electricity and creates inertia. Usually, the brake signal BRK is applied to the circuit of a standard DC motor for several seconds to cause the inertia to dissipate as heat which in turn causes the motor to stop.

On the contrary to the standard usage of the brake signal BRK (stopping a standard DC motor), this invention utilizes the brake signal BRK of the driver chip 40 to facilitate and sustain the flow of current. This concept will become more apparent by a description given hereinafter.

In operation, at any given time, either $T_{11}$ and $T_{14}$ or $T_{12}$ and $T_{13}$ will be activated. If forward signal $Fwd_1$ is on "1", then $T_{11}$ and $T_{14}$ are activated. $T_{11}$ will generate a current N which will flow into the stepper motor $L_1$, transistor $T_{14}$ and through resistor $R_1$ into ground G. The current N will generate a voltage $V_{R1}$ across $R_1$. Node 36 which is connected to the chip 40 through an input pin 44 sends the voltage $V_{R1}$ to a comparator 56 of the chip 40. Comparator 56 compares the $V_{R1}$ to a reference voltage $V_{Ref1}$ and when both voltages are at the same level, it generates a signal 58 which is connected to an output pin 60 of the chip 40.

Figure 4:
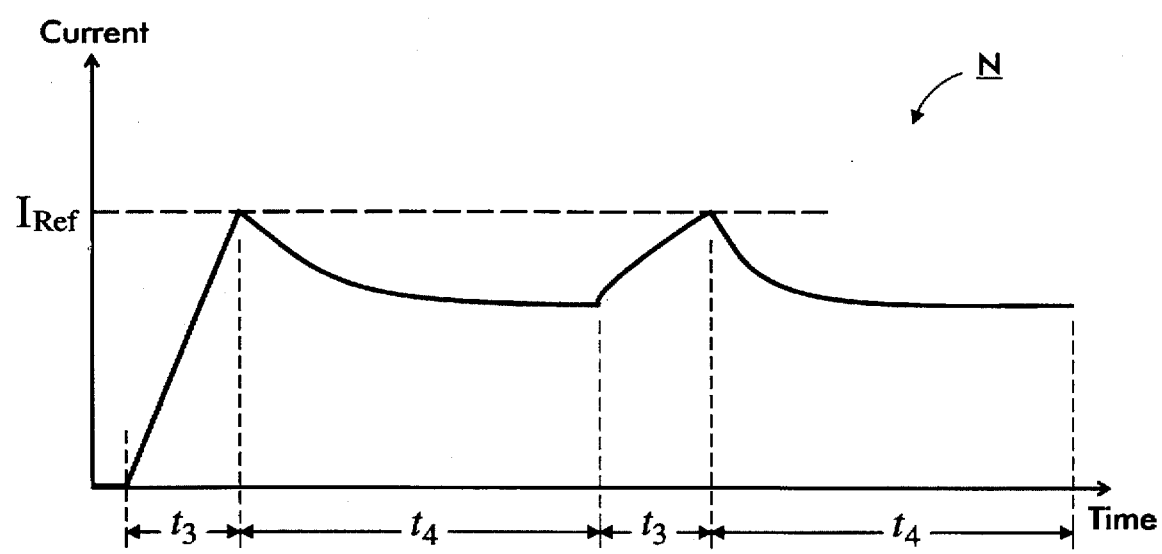
FIG. 4 shows a current generated through the circuit of FIG. 3.

Referring to FIG. 4, there is shown the current N which is generated by the circuit 30 of this invention. Referring to both FIGS. 3 and 4, during the period $t_3$, the transistor $T_{11}$ will be kept on until the current N causes the voltage $V_{R1}$ across resistor $R_1$ to reach a certain level $V_{Ref1}$. Once the voltage $V_{R1}$ reaches the reference voltage $V_{Ref1}$, the comparator 56 generates a signal 58. In the chip 40, the signal 58 is generated to inactivate transistors $T_{11}$ and $T_{12}$ through the gates $A_{11}$ and $A_{12}$. For the purpose of simplicity, the connections of signal 58 to the gates $A_{11}$ and $A_{12}$ are not shown. However, the signal 58 is also connected to pin 60 to indicate the current limit provided through the pin 44.

It should be noted that the numeral references given to the pins of chip 40 are strictly used for the purpose of identifying the pins in the specification of this invention and they do not represent the pin numbers given in the specification of the chip Si9978. However, the signal names "BRK", "DIR", and "En" are actual names used in the specification of the chip Si9978.

In this invention, the signal 58 from pin 60 is connected to a one shot timer 62. The one shot timer 62 is not a part of the chip 40. However, it should be noted that the chip 40 has an internal one shot timer which for the purpose of this invention is disabled.

In this invention, the signal 58 from pin 60 triggers the one shot timer 62 to generate a signal. The generated signal from the one shot timer 62 is used as a brake signal BRK which will be sustained by the one shot timer for a given period of time. The brake signal BRK activates the gates $O_{11}$ and $O_{12}$ which in turn activate the transistors $T_{13}$ and $T_{14}$. While the gates $O_{11}$ and $O_{12}$ are activated, the inverters $I_{11}$ and $I_{22}$ inactivate the gates $A_{11}$ and $A_{12}$. As a result, the transistors $T_{11}$ and $T_{12}$ will also be inactivated.

It should be noted that signal 58 also disables the gates $A_{11}$ and $A_{12}$. Therefore, at the time that the brake signal BRK of this invention is applied to the chip, both signal 58 and the outputs of inverters $I_{11}$ will inactivate the gate All and both signal 58 and the output of the inverter $I_{12}$ inactivate the gate $A_{12}$. There is a redundant inactivation, however, it does not interfere with the function of the circuit 30.

The brake signal BRK will activate both gates $O_{11}$ and $O_{12}$ which in turn activate both transistors $T_{13}$ and $T_{14}$. By turning on the transistors $T_{13}$ and $T_{14}$, a loop E will be generated which comprises the stepper motor $L_1$, transistor $T_{14}$ and transistor $T_3$. The current N starts circulating within loop E from node 32 through the stepper motor $L_1$ to node 34 and then through the transistor $T_{14}$ and transistor $T_{13}$ back to node 32. During period $t_4$, the brake signal BRK will keep both transistors $T_{14}$ and $T_{13}$ activated and the current N will keep circulating within loop E. It is essential to create a loop in a stepper motor circuit since sustaining the current of the stepper motor is very crucial.

As opposed to the traditional usage of the brake current in which the brake current is applied to the standard DC motor circuit for few seconds, in this invention, the brake current is applied to the stepper motor circuit only for duration in the range of micro-seconds (μsec). In the preferred embodiment of this invention, the brake current is applied for 40 μsec ($t_4$). However, for stepper motors with different inductance, different duration in the range of micro-seconds will be selected. Therefore, at the end of period $t_4$, the one shot timer 62 disables the brake signal BRK.

If the brake signal BRK was not used to create a loop E, a diode between the nodes 32 and 36 was needed to create a loop in which the current of the stepper motor could circulate. As it was previously mentioned, a diode in conjunction with a bipolar transistor cause the current to substantially decrease. In this invention, the brake signal BRK is used in an opposite manner for which it was intended to create a low resistance loop, through transistor $T_{13}$, in which the stepper motor current can circulate.

Since the model of each power MOSFET includes a diode, by using power MOSFETs $T_{11}$, $T_{12}$, $T_{13}$, and $T_{14}$, the diodes $D_1$, $D_2$, $D_3$, and $D_4$ of the circuit 10 of FIG. 1 are eliminated. It should be noted that the diodes within the transistors $T_{11}$, $T_{12}$, $T_{13}$, and $T_{14}$ are not as large as the diodes $D_{11}$, $D_2$, $D_3$ and $D_4$. However, they can function in the same manner. In the circuit 30 of this invention, since the bipolar transistors $T_3$ and $T_4$ and the diodes $D_3$ and $D_4$ are eliminated, the power waste is reduced. Due to the structure of MOSFETs, transistors $T_{13}$ and $T_{14}$ waste less power and have lower impedance than bipolar transistors $T_3$ and $T_4$ and waste much less power than the combination of the transistors $T_3$ and diode $D_4$ or transistor $T_4$ and diode $D_3$. Therefore, the power waste in the circuit 30 of this invention is substantially less than the power waste of the conventional circuit 10. As a result, the circuit 30 of this invention provides a low resistance current path. In circuit 30, the current N within loop E decreases with a lesser magnitude in comparison to the current M of the conventional circuit 10 of FIG. 1. This in turn improves the efficiency of the current regulator of this invention.

At the end of period $t_4$, once the brake signal BRK is disabled, transistor $T_{11}$ will be turned on within the period of $t_3$ and the current N will increase to a level which causes the voltage $V_{R1}$ to reach $V_{Ref1}$ which in turn causes the brake signal BRK to be generated. The process of turning on the transistors $T_1$ and $T_{14}$ during $t_3$ and turning on the transistors $T_{13}$ and $T_{14}$ during $t_4$ will be repeated for regulating the current of the stepper motor.

It should be noted that if transistors $T_{12}$ and $T_{13}$ are activated, the circuit 30 functions in the same manner as if transistors $T_{11}$ and $T_{14}$ were activated with the exception of the direction of current. When transistor $T_{12}$ and $T_{13}$ are activated, the direction of the current in the stepper motor and in the loop E will be the opposite of the direction of the current when the transistors $T_{11}$ and $T_{14}$ were activated. Therefore, in this invention, transistors $T_{13}$ and $T_{14}$ are used in a bi-directional manner.

It should also be noted that if one desires, a comparator outside of the chip can be used instead of the comparator 56 of the chip 40 to generate signal 58 which is connected to the one shot timer 62.

It should further be noted that the current regulator of this invention is not limited to the stepper motor applications and it can be utilized for different applications. For other applications, the stepper motor shown by $L_1$ in FIG. 3 will be replaced by a circuit which requires a current regulator such as the current regulator of this invention.

In addition, it should be noted that numerous changes in details of construction and the combination and arrangement of elements may be resorted to without departing from the true spirit and scope of the invention as hereinafter claimed.

We claim:

1. A current regulator comprising:

a first MOSFET transistor having a drain, a gate and a source;

a second MOSFET transistor having a drain, a gate and a source;

a third MOSFET transistor having a drain, a gate and a source;

a fourth MOSFET transistor having a drain, a gate and a source;

a power supply;

said drain of said first transistor and said drain of said second transistor being electrically connected to said power supply;

a first node;

a second node;

said source of said first transistor and said drain of said third transistor being electrically connected to said first node;

said source of said second transistor and said drain of said fourth transistor being electrically connected to said second node;

a load being electrically connected to said first node and said second node to provide an electrical path between said first node and said second node;

a third node said source of said third transistor and said source of said fourth transistor being electrically connected to said third node;

a ground;

a resistor having a first terminal and a second terminal;

said third node being electrically connected to said first terminal of said resistor and said ground being electrically connected to said second terminal of said resistor;

a driver chip;

said gate of said first transistor, said gate of said second transistor, said gate of said third transistor, and said gate of said fourth transistor all being operably connected to said driver chip;

said driver chip having a brake input signal;

means for generating said brake signal;

selecting means;

said driver chip and said selecting means being so constructed and arranged that when said brake signal is not generated said selecting means selectively activates said first transistor and said fourth transistor or said second transistor and said third transistor and when said brake signal is generated said third transistor and said fourth transistor are active whereby a low resistance current path is created when said brake signal is generated.

2. The current regulator recited in claim 1, wherein said load is a stepper motor.

3. The current regulator recited in claim 1, wherein said brake signal generating means comprises a comparator and a one shot timer.

4. The current regulator recited in claim 3, wherein said comparator is within said driver chip.

5. The current regulator recited in claim 3, wherein said comparator is outside of said driver chip.

6. The current regulator recited in claim 3, wherein said load is a stepper motor.

* * * * *